US012577807B2

(12) United States Patent
Frazier

(10) Patent No.: US 12,577,807 B2
(45) Date of Patent: Mar. 17, 2026

(54) VERTICALLY ADJUSTABLE STRIKE PLATE

(71) Applicant: W. Lynn Frazier, Corpus Christi, TX (US)

(72) Inventor: W. Lynn Frazier, Corpus Christi, TX (US)

( * ) Notice: Subject to any disclaimer, the term of this patent is extended or adjusted under 35 U.S.C. 154(b) by 93 days.

(21) Appl. No.: 18/244,457

(22) Filed: Sep. 11, 2023

(65) Prior Publication Data

US 2024/0133207 A1 Apr. 25, 2024
US 2024/0229504 A9 Jul. 11, 2024

Related U.S. Application Data

(60) Provisional application No. 63/408,583, filed on Sep. 21, 2022.

(51) Int. Cl.
*E05B 15/02* (2006.01)

(52) U.S. Cl.
CPC .................................. *E05B 15/025* (2013.01)

(58) Field of Classification Search
CPC .... E05B 15/02; E05B 15/0205; E05B 15/024; E05B 15/0245; E05B 15/025; E05B 2015/0275; E05B 2015/028; Y10T 292/705; Y10T 292/707
See application file for complete search history.

(56) References Cited

U.S. PATENT DOCUMENTS

| | | | | | |
|---|---|---|---|---|---|
| 4,171,836 | A * | 10/1979 | St. Aubin | E05B 15/0245 292/DIG. 55 |
| 7,000,959 | B2 | 2/2006 | Sanders | |
| 7,686,356 | B2 | 3/2010 | Wilder et al. | |
| 8,465,067 | B2 | 6/2013 | Webb et al. | |
| 10,040,150 | B2 | 8/2018 | Morales, Jr. | |
| 10,422,164 | B2 | 9/2019 | Cheng | |
| 10,927,568 | B2 | 2/2021 | Singh | |
| 2006/0157991 | A1 | 7/2006 | Nguyen | |
| 2007/0040397 | A1 | 2/2007 | Nicholas, Jr. et al. | |
| 2012/0286527 | A1 | 11/2012 | Mullet et al. | |
| 2013/0000203 | A1 | 1/2013 | Platt | |
| 2015/0204107 | A1 | 7/2015 | Sweeten | |
| 2016/0305156 | A1 * | 10/2016 | Kamody | E05B 15/024 |
| 2017/0175417 | A1 | 6/2017 | Sweeten | |
| 2018/0066449 | A1 | 3/2018 | Kamody et al. | |
| 2023/0072643 | A1 * | 3/2023 | Ruml | E05B 15/024 |

* cited by examiner

*Primary Examiner* — Christine M Mills
*Assistant Examiner* — Yahya Sidky
(74) *Attorney, Agent, or Firm* — Jackson Walker LLP

(57) ABSTRACT

A strike plate assembly is repeatedly vertically and securely adjustable to serial secure positions on a door jamb for securing a bolt without loosening or removing the assembly's jamb attachment screws and without resetting its jamb attachment screws within new jamb holes.

10 Claims, 4 Drawing Sheets

VERTICALLY ADJUSTABLE STRIKE PLATE

RELATED APPLICATIONS

This application claims priority to U.S. Patent Application No. 63/408,583, filed Sep. 21, 2022. This prior application is herein incorporated by reference in its entirety.

TECHNICAL FIELD

A strike plate for receiving a bolt.

BACKGROUND

Doors typically have either or both a latch or a bolt for holding the door within a door jamb. For simplicity, "door" refers to movable barriers, usually slidable or hinged, for opening or closing and opening. "Bolt" refers to bolts, rods, and latches for fastening a door to a jamb except where noted or the context requires otherwise. Door jambs often have a bolt recess for receiving the door's bolt. Many bolt recesses have a strike plate with a strike plate opening aligned with the bolt recess. When properly installed, the door's bolt and the strike plate's opening are positioned and sized so the strike plate opening can receive the door's bolt. The strike plate opening is desirably small enough and placed so that when the door is closed within the door's jamb, the bolt can enter through the strike plate opening into the bolt recess and securely hold the door to the jamb. Attaching a strike plate to the door jamb reinforces the door jamb's bolt recess for securely holding the door within the jamb against the door being forced open without first retracting the bolt from the strike plate opening and bolt hole.

Door jambs, door bolt recesses, and door bolts are known in the art. Jambs and doors are often mass-produced with insets or markings for strike plates and bolts. These mass-produced items do not always adequately align at construction sites or at older buildings that may have shifted since initial construction.

Properly aligning the door's bolt and strike plate opening can be challenging when assembling a door within a door frame. The first step is typically to attach the door's hinges to the first side door jamb of the door frame. A worker typically fastens a strike plate to the second side door jamb over the bolt recess to receive the door's bolt.

However, the bolt and the strike plate opening must be aligned. Horizontal alignment is typically achieved by making the distance from the bolt's inner side to the jamb's inner face equal to the distance from the strike plate's inner side opening to the door jamb's inner face. The bolt and strike plate openings are shaped and sized so this positioning accomplishes horizontal alignment.

The bolt and strike plate openings must also be in vertical alignment for the bolt to enter the strike plate opening. Vertical alignment is more problematic than horizontal alignment. Obtaining vertical alignment lacks a bolt to inner jamb surface reference distance. Further, when the door is closed within the door jamb, the exact vertical alignment of the bolt and the strike plate opening may be mainly hidden from the on-site worker's view. Further, when the door is open, vertical alignment of the bolt and now distant strike plate opening may be challenging for the on-site worker to determine. As a practical matter, vertical alignment of the door bolt/strike plate opening is often begun by using factory markings and verified by on-site workers by closing the door into the door jamb and turning the knob of the door lock to move the bolt toward the strike plate opening to see if the bolt does or does not securely fit within the strike plate opening. If not, the door is opened, and the worker makes a new best guess concerning vertical alignment and tries again to align the bolt and strike plate opening properly.

However, removing, moving, and reinstalling a strike plate can be challenging. Strike plates are often attached to the door jamb with attachment screws. Attaching a strike plate to a door jamb may require threading screws through strike plate screw holes and screwing the screws into the second side door jamb. Correcting misalignment of the bolt and strike plate opening may require removing the strike plate screws, adjusting the position of the strike plate to the worker's best guess of an acceptable vertical alignment position, and reinstalling the strike plate to the jamb by threading the screws into different places on the door jamb.

On-site positioning and repositioning a strike plate on a door jamb to obtain proper alignment of the bolt and strike face opening on the fly by removing the strike plate screws, moving the strike plate, and resetting the screws into new door jamb positions can be aggravating and time-consuming.

Sometimes, a door jamb and door combination will have a proper vertical alignment for some years but later shift out of acceptable vertical alignment relative to each other. This may be caused by weather conditions, more or less atmospheric humidity, structural settling of the building, etc. Such shifting may cause the bolt and the strike plate opening to become misaligned. The bolt may then have difficulty entering the strike plate opening. Material misalignment may interfere with or even completely preclude the bolt from entering the strike plate opening. Repairing such later misalignment may require removing the strike plate screws, repositioning the strike plate, and resetting the screws into new door jamb positions. This can be aggravating and time-consuming. Security attachment screws, longer screws for providing security against forcing the door open, can be challenging to install and remove. If the face of an attachment screw is damaged, further insertion or removal is even more difficult. Old wood in the jambs of old buildings may be hard and brittle, resist screw removal and insertion, and may split.

There is a long felt need for a strike plate assembly that is serially vertically and securely adjustable on a door jamb without removing the assembly's jamb attachment screws and resetting them within new jamb holes and without loosening the attachment screws.

SUMMARY

A strike plate assembly is repeatedly vertically and securely adjustable to serial secure positions on a door jamb for securing a bolt without loosening or removing the assembly's jamb attachment screws and without resetting its jamb attachment screws within new jamb holes.

DETAILED DESCRIPTION

Figure 4:
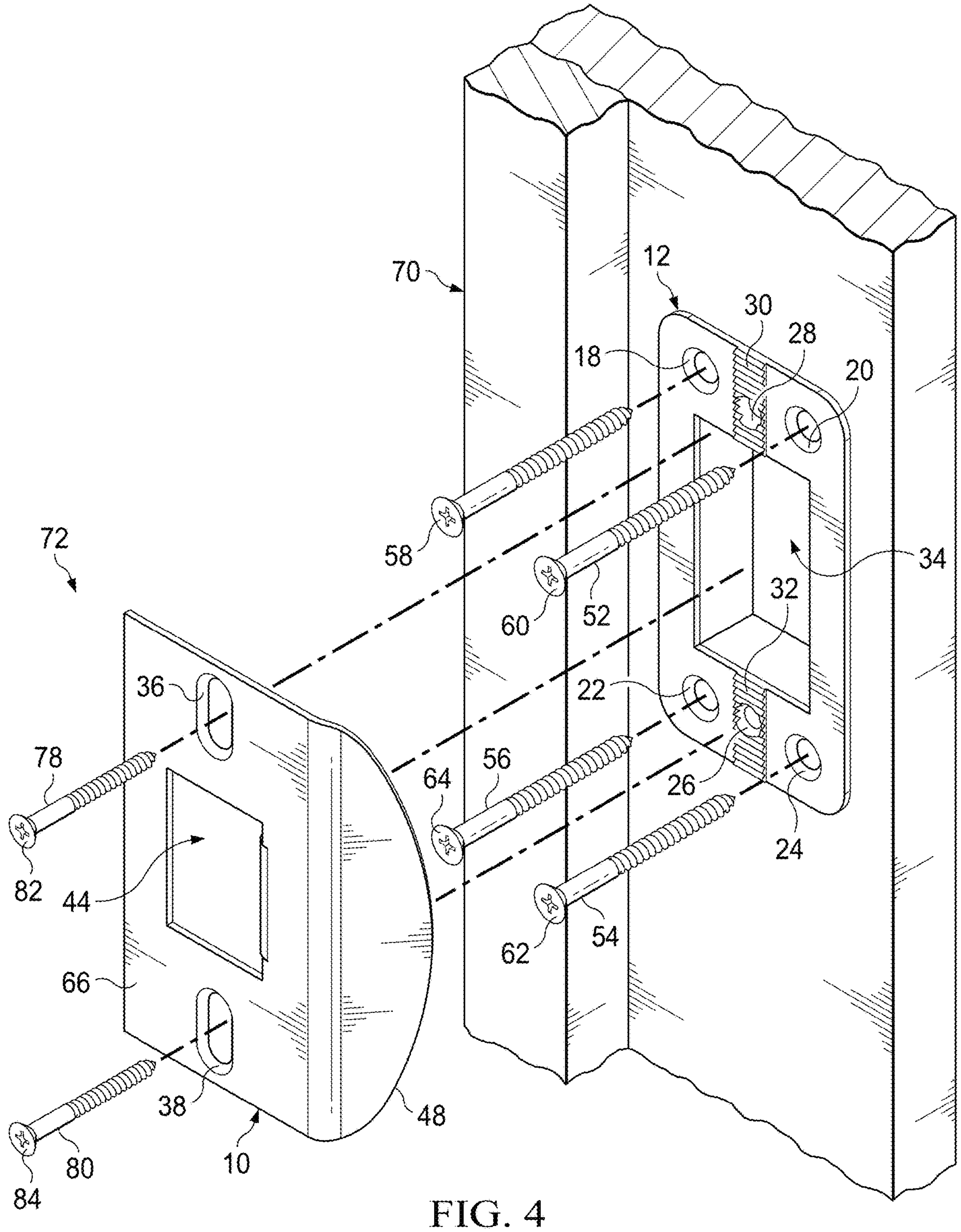
FIG. 4 shows an exploded view of a vertically adjustable strike plate assembly installed in a door jamb.

Although the described apparatus may be usefully used in other orientations and shapes, "vertical," as used in this description, means an orientation parallel to a typical door jamb 70 for a standard door, as shown in FIG. 4. Other door and jamb combinations and orientations are possible, and for them, the described structures and principles should be reoriented and adjusted as appropriate. Likewise, "horizontal," as used in this description, means an orientation perpendicular to the door jamb. It is emphasized that "vertical" and "horizontal" are used here for descriptive purposes only. In practice, the strike plate assembly 72 and its elements may have any orientation.

Figure 1:
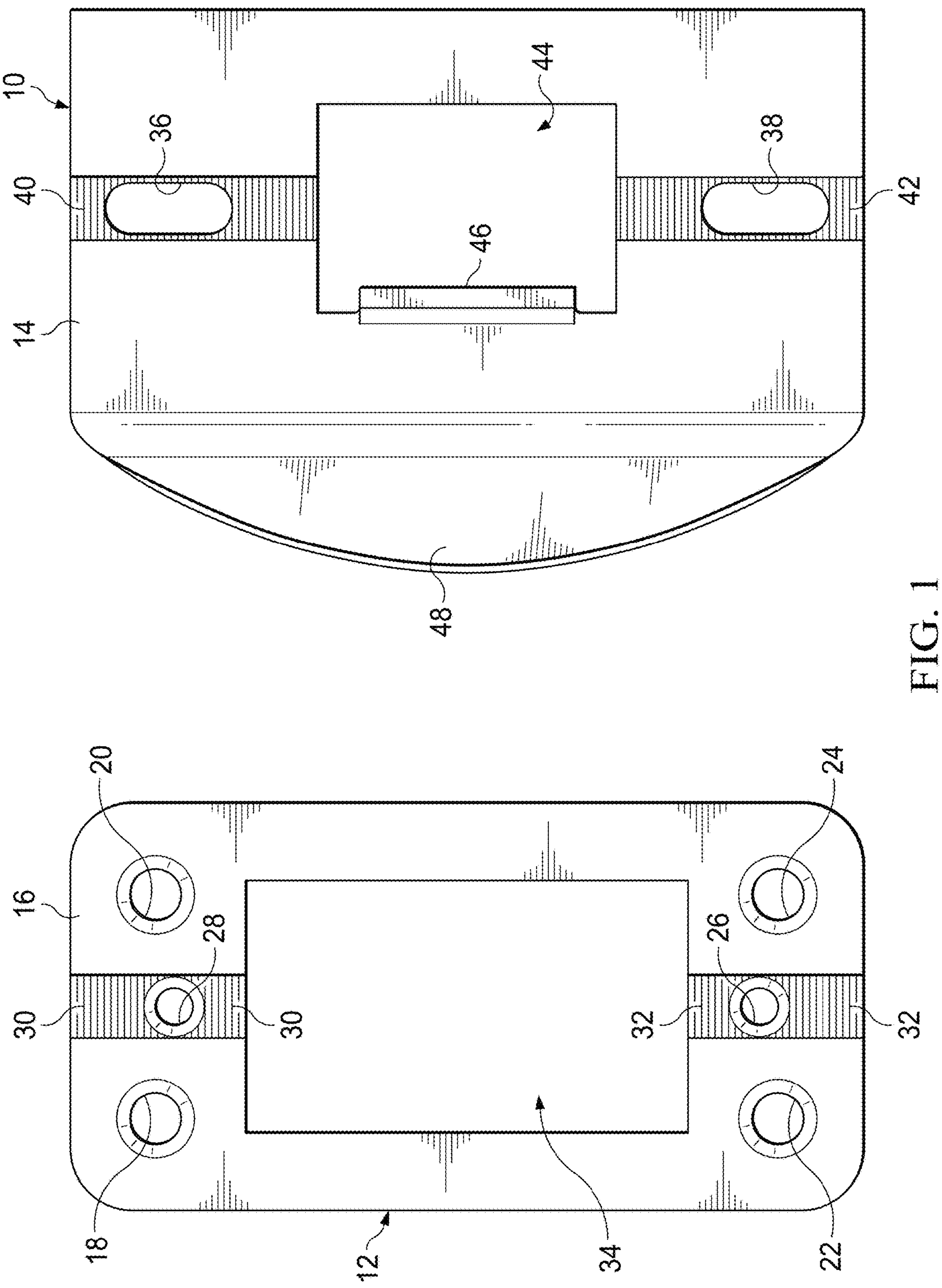
FIG. 1 shows a strike plate's rear face and a baseplate's front face.

FIG. 1 shows strike plate 10 and baseplate 12. Strike plate 10 and baseplate 12 are preferably metallic, flat, and rectangular, although other compositions and shapes are possible. Strike plate 10 and baseplate 12, shown in FIG. 1, are most preferably comprised of steel. For example, strike plates and baseplates comprised of plastics can reduce material and manufacturing costs. The rear face 14 of strike plate 10 and the front face 16 of baseplate 12 are shown in FIG. 1. Rear face 14 of strike plate 10 and front face 16 of baseplate 12 are preferably flat except as discussed below and, unless tightly secured to each other as discussed below, are vertically movable relative to each other. Baseplate 12 has baseplate attachment openings 18, 20, 22, and 24 and positioning openings 26 and 28

Baseplate bolt opening 34 is preferably smaller than the door jamb bolt recess in jamb 70 and is sized and shaped to accept the door's bolt. Strike plate bolt opening 34 is preferably sized and shaped to securely receive the bolt. Preferably, bolt opening 34 securely holds there within the bolt and thereby holds the door against the jamb. This impedes or prevents air from flowing between the door and the jamb. It protects against the door being rattled against the jamb. Because strike plate opening is preferably sized and shaped to be just larger than the bolt and securely receive the bolt, its size, and shape do not change, even if the location of the bolt opening 44 needs to be adjusted to permit the bolt to enter after the vertical realignment of bolt opening 44. Strike plate bolt opening 44 is preferably vertically shorter and horizontally narrower than baseplate bolt opening 34 and is located within strike plate 10, so when strike plate 10 and baseplate 12 are aligned as a strike plate assembly 72 (FIG. 4), strike plate opening 44 can be aligned with baseplate bolt opening 34 so a door's bolt can pass through both strike plate opening 44 and rear bolt opening 34 and into a door frame recess. Strike plate bolt opening 44 is typically smaller than the door jamb bolt recess, longitudinally shorter than bolt opening 34, and is sized and shaped to accept the door's bolt. Baseplate bolt opening 34 is at least horizontally as wide as strike plate bolt opening 44. Baseplate bolt opening 34 is vertically longer than strike plate bolt opening 44.

When assembled and installed upon a door jamb to engage a door bolt, rear face 14 of strike plate 10 is preferably fixed flush upon front face 16 of baseplate 12. Attachment openings 18, 20, 22, and 24 are beveled to receive screw heads 58, 60, 62, and 64 of attachment screws 50, 52, 54, and 56 (shown in FIG. 4). Positioning openings 26 and 28 are located to receive positioning screws 78 and 80. Screw heads 58, 60, 62, and 64 are preferably larger than positioning screw heads 82 and 84. Openings 18, 20, 22, and 24 are preferably larger than openings 26 and 28 to accommodate attachment screws 50, 52, 54, and 56, which are preferably larger than positioning screws 78 and 80. Beveled openings 18, 20, 22, and 24 and larger screw heads 58, 60, and 62 are shaped and sized so that when attachment screws 50, 52, 54, and 56 are threaded through the baseplate attachment openings 18, 20, 22 and 24 and into the door jamb they securely hold baseplate 12 to the door jamb and screw heads 58, 60, 62, and 64 do not protrude outward from front face 16. If screw heads 58, 60, 62, or 64 protrude outside front face 16, they may obstruct a flush fixation of rear face 14 of strike plate 10 with front face 16 baseplate 12.

Baseplate 12 has baseplate columns of teeth 30 and 32 and baseplate bolt opening 34. As shown in FIG. 1, the baseplate columns of teeth 30 and 32 are located on baseplate front face 16 and vertically oriented on front face 16. Baseplate columns of teeth 30 and 32 comprise parallel regular alternating protruding teeth and receding valleys. Relative to the flat surface of the front face 16 of baseplate 12, the peaks of the baseplate columns of teeth preferably align with the valleys and are less than or equal to the depth of the valleys of the columns of teeth. The peaks of columns of teeth 30 and 32 are preferably spaced at a constant distance from the peaks of adjacent teeth. The valleys of baseplate columns of teeth 30 and 32 are preferably spaced at a constant distance from adjacent valleys. The peaks and valleys are regularly spaced relative to each other. The rows of the teeth of column of teeth 30 and 32 are shown as being horizontal, i.e., perpendicular to the door jamb; they may have any orientation as long as the rows of teeth of column of teeth 30 are regular parallel rows and the rows of teeth of column of teeth 32 are regular parallel rows. The orientation of teeth 30 and the orientation of teeth 32 may be different orientations. Alternatively, either baseplate front face 16 may have teeth without valleys, and strike plate rear face may have valleys without teeth, the teeth receivable in the valleys, or vice versa. The teeth and valleys can be machined, stamped, molded, pressed, or otherwise manufactured into baseplate 12. They are preferably stamped.

Baseplate columns of teeth 30 and 32 are preferably oriented parallel to the longitudinal axis of the door jamb 70, door, installed strike plate 10, and installed baseplate 12. Baseplate columns of teeth 30 and 32 preferably extend from the bottom of baseplate 12 to the top of baseplate 12, interrupted only by baseplate bolt opening 34. Columns of teeth 30 and 32 are shown in FIG. 1, extending from the top to the bottom of baseplate 12. While preferable, this is not necessary. Shorter, narrower, or wider columns of teeth and valleys are functional. Likewise, while column of teeth 30 being on a straight line with column of teeth 32, interrupted only by bolt opening 34, is preferable, this orientation is not required. Column of teeth 30 may be located further from or closer to the door jamb than column of teeth 32.

Figure 3:
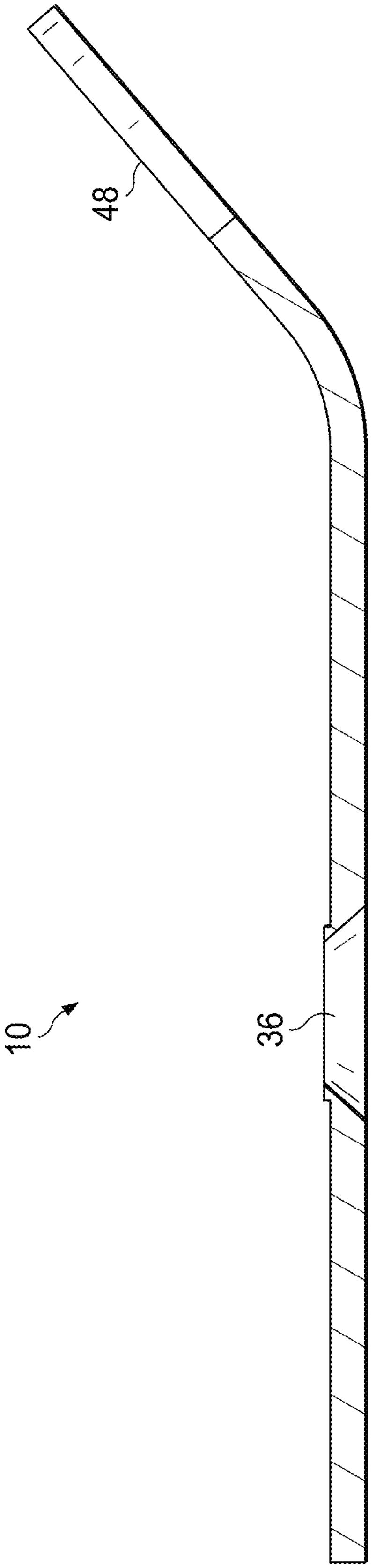
FIG. 3 shows a vertical perspective of a strike plate.

Strike plate 10 has positioning slots 36 and 38, strike plate columns of teeth 40 and 42, and bolt opening 44. Strike plate bolt hole 44, depicted in FIG. 1, is typically sized and shaped for receiving and retaining a latch or bolt and has inner flap 46 and outer flap 48, as shown. Inner flap 46 helps hold strike plate 10 to the door jamb 70. Inner flap 46 may be bendable toward the center of bolt opening 44 to guide the bolt and potentially decrease the horizontal width of opening 44 accessible to the door latch. This may be helpful for more horizontally tightly securing the bolt within strike plate bolt whole 44 and for securing strike plate 10 within the door jamb. FIG. 3 shows a vertical perspective of a strike plate 10. Flange 48 guides the door bolt toward the bolt opening. Front positioning opening is sloped to secure a positioning screw 78 or 80 to hold strike plate 10 to the jamb without positioning screw head 82 or 84, obstructing the door from closing. A different strike plate for receiving and retaining a door's deadbolt or latch may sometimes not have a bendable flap 46 or outer flap 48.

Strike plate columns of teeth 40 and 42 are vertically positioned and oriented on strike face rear face 14, as shown.

Although the individual teeth and valleys of strike plate columns of teeth 40 and 42 can be manufactured into the baseplate in various manners, they are preferably stamped into strike plate 10. Relative to the flat surface of the strike plate rear face 14 plate, the peaks of the teeth are preferably equal to or less than the depth of the valleys and are preferably constant throughout columns 40 and 42. The height, depth, shapes, and orientation of the strike plate columns of teeth 40 and 42 should preferably match the height, depth, shapes, and orientation of the peaks and valleys of baseplate columns of teeth columns 30 and 32. Strike plate columns of teeth 40 and 42 extend from the bottom of strike plate 10 to the top of strike plate 10, interrupted by strike plate bolt opening 44. The description of baseplate columns of teeth 30 and 32 is generally applicable to strike plate columns of teeth 40 and 42

Strike face columns of teeth 40 and 42 and baseplate columns of teeth 30 and 32 are preferably sized, shaped, positioned, and oriented to mate with each other when strike plate 10 is compressed against baseplate 12 by tightening positioning screws 78 and 80 through strike plate openings 36 and 38 and baseplate positioning slots 26 and 28 and into the door jamb. Strike face columns of teeth 40 and 42 and baseplate columns of teeth 30 and 32 are preferably parallel to the longitudinal axis of the door jamb and door. Further, they are preferably generally parallel to the installed strike plate's and baseplate's longitudinal axes.

The function of the teeth can be somewhat accomplished with alternating wavy, vertical, crossed, or the like valleys and teeth. The outer baseplate face and the inner strike plate face may be entirely or partially comprised of an increased friction portion. The friction portion may be imprinted on the outer baseplate face, the inner strike plate face, or both or otherwise imposed, whether by scratching, etching, molding, machining, or otherwise, to make the plates less vertically slidable against each other.

Figure 2:
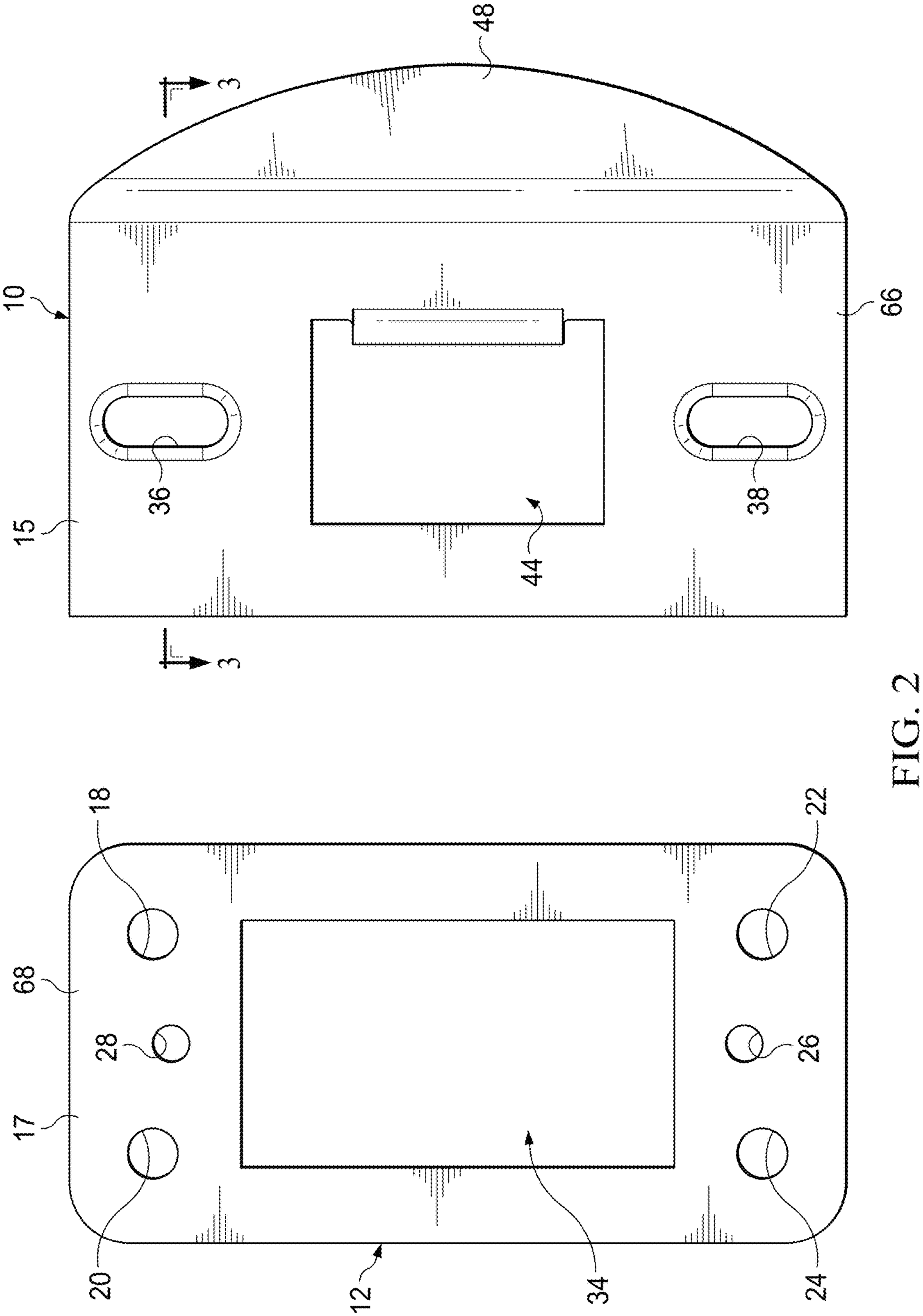
FIG. 2 shows a strike plate's front face and a baseplate's rear face.

FIG. 2 shows the reverse sides of strike plate 10 and baseplate 12 relative to the sides shown in FIG. 1, namely strike plate front face 15 and baseplate rear face 17. FIG. 2 shows strike plate 10's front face 66 and baseplate 12's rear face 68. The other side of attachment openings 18, 20, 22, and 24 in baseplate 12 are shown. The other side of positioning openings 26 and 28 in baseplate 12 are shown. The other side of rear bolt opening 34 in baseplate 12 is shown. Strike plate positioning slots 36 and 38 are beveled to flushly receive screw heads 82 and 84 of positioning screws 78 and 80. The outer side of front bolt opening 44, inner flap 46, and outer flap 48 are shown.

FIG. 3 shows a vertical perspective of strike plate 10.

FIG. 4 shows an exploded view of strike plate 10 and baseplate 12 installed in a door jamb 70 with the described attachment and positioning screws. When assembled and installed upon door jamb, 70 to engage a door bolt, rear face 14 of strike plate 10 is preferably fixed flush upon front face 16 of baseplate 12. The complete assembly of installed items is strike plate assembly 72. Although strike plate 10 and baseplate 12 are independent elements, upon being securely fastened to each other with positioning screws 78 and 80, as shown in FIG. 6, they function as a single unit, their baseplate columns of teeth 30 and 32 and strike plate's columns of teeth 40 and 42 meshing to join strike plate 10 and baseplate 12 into functional single strike plate assembly 72. "Mesh," as used herein, means that reciprocal peaks and valleys or high and low portions cooperatively generally fit together or engage with each other to interlock with each other and resist sliding forces. By analogy, the teeth of an automobile's mating gears mesh, engage, and interlock with each other. Likewise, the rough faces of sheets of sandpaper facing each other mesh, engage in interlock with each other, although less perfectly than mating gears mesh with each other.

Attachment openings 18, 20, 22, and 24 are beveled to receive screw heads 58, 60, 62, and 64 of attachment screws 50, 52, 54, and 56 (shown in FIG. 6). Positioning openings 26 and 28 receive positioning screw heads 82 and 84 of positioning screws 78 and 80. Screw heads 58, 60, 62, and 64 are preferably larger than positioning screw heads 82 and 84. Openings 18, 20, 22, and 24 are preferably larger than openings 26 and 28 to accommodate larger screw heads 58, 60, 62, and 64. Beveled openings 28, 20, 22, and 24 and larger screw heads 58, 60, and 62 are shaped and sized so when attachment screws 50, 52, 54, and 56 are threaded through baseplate attachment openings 18, 20, 22, and 24 and into door jamb 70, they securely hold baseplate 12 to the door jamb, and screw heads 58, 60, 62, and 64 do not protrude outward from the front face 16. If screw heads 58, 60, 62, or 64 protrude outside front face 16, they may obstruct a flush fixation of rear face 14 of strike plate 10 on front face 16 baseplate 12.

Attachment screws 50, 52, 54, and 56 are screwed within door jamb 70 and securely hold back plate 12 to door jamb 70. Because the size and slope of screw heads 58, 60, 62, and 64 correspond to the pitch of beveled openings 28, 20, 22, and 24, screw heads 58, 60, 62, and 64 of attachment screws 50, 52, 54 and 56 do not obstruct parallel planar fixation of strike plate 10 on baseplate 12. Strike plate 10 is thus capable of fitting flush against baseplate 12

Attachment screws 50, 52, 54, and 56 (shown in FIG. 4) are large enough to securely hold baseplate 12 to door jamb 70. Attachment screws 50, 52, 54, and 56 are most preferably 1 to 2 inches long, preferably from half an inch to 3 inches long, and usefully any length useful for the particular installation. Attachment screws 50, 52, 54, and 56 are long enough to reinforce the door jamb against an attempted forced door opening by an attempted intruder breaking the bolt out of the door jamb recess and strike plate 10. Preferably, attachment screws 50, 52, 54, and 56 are substantially larger and longer than positioning screws 78 and 80.

Positioning screws 78 and 80 (shown in FIG. 4) are large enough to securely hold strike plate 10 to baseplate 12 but small enough to permit a relatively lesser risk of damage and lesser effort to loosen and then retighten them than the risk of damage and effort needed to remove the attachment screws and reinstall when in new door jamb positions. Relatively more effort is required to install and remove attachment screws 50, 52, 54, and 56 than to loosen and retighten screws 78 and 80.

The teeth and valleys of column 30 of baseplate 12 interlock with teeth and valleys of column 40 of strike plate 10, and the teeth and valleys of column 32 of baseplate 10 interlock with teeth and valleys of 42 of strike face 10. When the teeth and valleys of columns 30 and 32 are not interlocked with the teeth and valleys of columns 40 and 42, baseplate 10 and baseplate 12 are slidable relative to each other. When positioning screws 78 and 80 are inserted through face plate positioning openings 36 and 38 and threadably engaged with and tightly screwed into rear positioning openings 26 and 28, strike plate 10 is compressed against baseplate 12. This causes the teeth and valleys of columns 30 and 32 to interlock with the teeth and valleys of columns 40 and 42. When the teeth and valleys of columns 30 and 32 have meshed with the teeth and valleys of columns 40 and 42, baseplate 10 and baseplate 12 are not vertically slidable relative to each other. The respective opposing interlocking teeth and valleys create frictional and obstructing barriers to baseplate 10 vertically sliding on baseplate 12

In this configuration, front bolt opening 44 and rear bolt opening 34 define a strike hole 76, as shown in FIG. 1. Strike hole 76 defines an opening through the strike plate assembly 72, where the bolt may enter and be secured.

The vertical position of strike hole 76 may be changed by partially or totally unscrewing and loosening positioning screws 78 and 80. Loosening or partial separation of strike plate 10 and baseplate 12 enables baseplate columns of teeth 30 and 32 to disengage from strike plate columns of teeth 40 and 42. This disengagement of columns of teeth 30 and 32 from columns of teeth 40 and 42 unfixes strike plate 10 from baseplate 12 and makes strike face 10 vertically movable relative to baseplate 12. If the on-site worker installing or readjusting judges strike plate bolt opening 44 to be too low relative to the bolt, the worker may slide or move loosened strike plate 10 upward relative to baseplate 12. If the worker judges strike plate bolt opening 44 too high relative to the bolt, the worker may slide or move loosened strike plate 10 downward relative to baseplate 12. The worker can then retighten positioning screws 78 and 80, which reengages strike plate 10's columns of teeth and valleys 40 and 42 with baseplate 12's columns of teeth and valleys 30 and 32. When the respective vertically opposing teeth and valleys are again meshed and interlocked, strike plate 10 is no longer movable or slidable relative to baseplate 12

This vertical adjustment can be made without varying the acceptable adjustment of strike plate 10 relative to the bolt. Removing this potential for on-site error is an important benefit of the described improvement relative to adjusting strike plate 10 position by removing attachment screws and judging/misjudging proper new attachment screw positions in the door jamb to produce a target new strike plate hole/bolt alignment. The new screw attachment position may produce an acceptable vertical strike plate hole/bolt alignment. Even if proper vertical alignment is produced, the new attachment screw position may not deliver horizontal strike plate hole/bolt alignment. The on-site worker, however, will only know the bolt does not enter the strike plate hole because the closed door jamb obscures visual inspection. The difficulty is increased for older structures with hardwood that may split.

The strike plate positioning opening will provide the discussed advantages if it has a vertical length of at least 50% longer than its horizontal width. The strike plate positioning opening will preferably have a vertical length of at least 100% longer than its horizontal width. Strike plate positioning opening will most preferably have a vertical length of at least 200% longer than its horizontal width. Longer and intermediate lengths may be advantageous in different circumstances.

Accordingly, the described structure permits vertical adjustment of the strike plate against the baseplate without loosening or repositioning attachment screws 50, 52, 54, and 56. This is a considerable advantage because these are large screws securely screwed into the jamb to prevent unwanted forced door opening by breaking the jamb. Loosening attachment screws 50, 52, 54, and 56 to slide baseplate vertically against the jamb is prevented by baseplate attachment openings 18, 20, 22, and 24. Further, loosening long and large attachment screws 50, 52, 54, and 56 may strip one or more attachment screw heads 58, 60, 62, and 64. Thus, the described structure, which permits vertical adjustment of the strike plate opening 44 without loosening attachment screws 50, 52, 54, and 56, is advantageous. Further, the alternative of completely removing and repositioning attachment screws 50, 52, 54, and 56 is time-consuming and challenging. Forcing these large screws into the jamb may split or weaken it.

In some embodiments, either or both baseplate columns of teeth 30 and 32 and strike plate columns of teeth 40 and 42 may be omitted. In such a structure, strike plate 10 may be sufficiently fixed upon baseplate 12 by tightening positioning screws 78 and 80. In this structure, strike plate 10 is slidable upon baseplate 12 when positioning screws 78 and 80 are loosened, and friction holds strike plate 10 and baseplate 12 together when positioning screws 78 and 80 are tightened. Alternatively, other anti-sliding impediments may be included between baseplate front face 16 and strike plate rear face 14 to prevent undesired sliding of strike plate rear face 14 against baseplate front face 16. This can be a roughened surface on one or both facing surfaces, dimples or protrusions, removable adhesive, or the like. Nevertheless, the mating baseplate columns of teeth 30 and 32 and strike plate columns of teeth 40 and 42 facilitate precise determinable and repeatable vertical adjustments of strike plate opening 44 without loosening or removing attachment screws 50, 52, 54, or 56. One or more attachment openings and attachment screws.

Baseplate opening 34 may be vertically longer than strike plate opening 44 to accommodate the bolt protruding through strike plate 44 and into baseplate opening 34 after strike plate 10 has been vertically adjusted against baseplate 12. Shapes and designs will vary with different door designs, knobs, sizes, and materials, i.e., brass, stainless, nickel, etc.

Strike plates may have more than one strike plate opening for accommodating any combinations of laches and bolts. The apparatus described is useful for all types of strike plates. Either latch strike plates or deadbolt strike plates may benefit from a structure and method of vertical adjustment that is useful during initial installation and later due to door shifting relative to the door jamb.

Unless otherwise stated or implied by context, "screws" include rod-like attachment means such as threaded screws, bolts, rods, or similar attachment means.

Unless otherwise noted, articles depicted in the drawings are not necessarily drawn to scale; however, the drawings depict relative size and placement. The term "about" is defined as being close to as understood by one of ordinary skill in the art, and in one non-limiting embodiment, the terms are defined to be within 10%. The term "substantially" and its variations are defined as being largely but not necessarily wholly what is specified as understood by one of ordinary skill in the art, and in a non-limiting embodiment, substantially refers to ranges within 1%. When "about" or "approximately" is provided at the beginning of a numerical list, the term modifies each number of the numerical list. In some numerical listings of ranges, some lower limits listed may be greater than some upper limits listed. One skilled in the art will recognize that the selected subset will require the selection of an upper limit above the specified lower limit. Unless otherwise indicated, all numbers expressing quantities and the like used in the present specification and associated claims are to be understood as being modified in all instances by the terms "about" or "approximately." As used herein, "approximately" encompasses +/−5% of each numerical value. For example, if the numerical value is "approximately 80%," it can be 80%+/−5%, equivalent to 75% to 85%. Accordingly, unless indicated to the contrary, the numerical parameters set forth in the following specification and attached claims are approximations that may vary depending upon the desired properties obtained by the exemplary embodiments described herein. At the very least, and not as an attempt to limit the application of the doctrine of equivalents to the scope of the claim, each numerical parameter should at least be construed in light of the number of reported significant digits and by applying ordinary rounding techniques.

The terms "inhibiting" or "reducing" or any variation of these terms refer to any measurable decrease, or complete inhibition, of the desired result. The terms "promote" or "increase" or any variation of these terms includes any measurable increase or completion of the desired result. The term "effective," as used in the specification and/or claims, means adequate to accomplish a desired, expected, or intended result. The terms "a" or "an" when used in conjunction with the word "comprising" in the claims and/or the specification may mean "one," but it is also consistent with the meaning of "one or more," "at least one," and "one or more than one." The term "each" refers to each member of a set or each member of a subset of a set. The terms "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

It should be understood that, although exemplary embodiments are illustrated in the figures and description, the principles of the present disclosure may be implemented using any number of techniques, whether currently known or not. The present disclosure should not be limited to the exemplary implementations and methods illustrated in the drawings and description herein. Thus, although the invention has been described regarding specific embodiments, this description is not meant to be construed in a limited sense. Various embodiments may include some, none, or all of the enumerated advantages. Various modifications of the disclosed embodiments and alternative embodiments of the inventions will become apparent to persons skilled in the art upon reference to the description of the invention. It is, therefore, contemplated that the appended claims will cover such modifications that fall within the scope of the invention. Modifications, additions, or omissions may be made to the systems, apparatuses, and methods described herein without departing from the scope of the disclosure. For example, the operations of the systems and apparatuses disclosed herein may be performed by more, fewer, or other components in the methods described may include more, fewer, or other steps. Additionally, steps may be performed in any suitable order.

In interpreting the claims, it is not intended that any of the claims or claim elements invoke 35 U.S.C. 112(f) unless the words "means for" or "step for" are explicitly used in the particular claim.

The invention claimed is:

1. A strike plate assembly kit for a strike plate assembly capable of being connected to a jamb and receiving a bolt from an adjacent door comprising:

a baseplate sized and shaped to be capable of being connected to the jamb and receiving the bolt, the baseplate comprising:

a baseplate bolt opening in the baseplate capable of receiving the bolt;

multiple jamb attachment openings in the baseplate capable of receiving an attachment screw; and multiple baseplate adjustment openings in the baseplate capable of receiving a positioning screw;

a strike plate sized and shaped to be capable of being positioned between the door and the baseplate, connected to the baseplate, and receiving the bolt, the strike plate comprising:

a strike plate bolt opening in the strike plate capable of receiving the bolt, being a slot through the strike plate, having a vertical length at least 50% longer than its horizontal width, and sized and shaped to be capable of receiving a positioning screw; and multiple strike plate positioning openings in the strike plate, wherein vertical is the approximate longitudinal direction of the jamb face adjacent to the door, and horizontal is the approximate direction along the jamb face orthogonal to the vertical;

multiple attachment screws sized and shaped to be capable of being inserted through a baseplate attachment opening and into the jamb and tightened into the jamb to hold the baseplate to the jamb;

multiple positioning screws each sized and shaped to be capable of being inserted through a strike plate positioning opening and into a baseplate adjustment opening and repeatedly either tightened to hold the strike plate to the baseplate or loosened or removed to permit vertical movement of the strike plate;

the multiple strike plate positioning openings and multiple baseplate adjustment openings are respectively positioned, sized, and shaped to be capable of being aligned with each other and receive one of the positioning screws through a strike plate positioning opening and into one of the baseplate adjustment openings;

the baseplate has an outer face facing away from the jamb, a first vertical column of baseplate teeth and valleys located on the baseplate outer face above the baseplate opening, and a second vertical column of baseplate teeth and valleys located on the baseplate outer face below the baseplate opening;

the strike plate has an inner face facing toward the jamb, a first vertical column of strike plate teeth and valleys located on the strike plate inner face above the strike plate opening, and a second vertical column of the strike face teeth and valleys located on the strike plate inner face below the strike plate opening;

the strike plate does not have openings for receiving the attachment screws;

the baseplate teeth and valleys and the strike plate teeth and valleys are sized and shaped so the baseplate teeth and valleys and the strike plate teeth and valleys are capable of meshing with each other when the positioning screws are tightened and press the baseplate teeth and valleys, and the strike face teeth and valleys together, the meshed baseplate teeth and valleys and strike plate teeth and valleys preventing the strike face from being vertically movable against the baseplate;

the baseplate teeth and valleys and the strike plate teeth and valleys are capable of being disengaged from each other when the positioning screws are loosened or removed and do not press the baseplate teeth and valleys and the strike face teeth and valleys together, the loosening or removing the positioning screws from the baseplate permitting the strike plate to be moved vertically relative to the baseplate;

the strike plate assembly kit components, namely, the baseplate, the strike plate, the attachment screws, and the positioning screws, are sized and shaped to be capable of being assembled into a strike plate assembly and installed on the jamb, wherein:

the attachment screws are inserted through the baseplate attachment openings and into the jamb and tightened into the jamb to hold the baseplate to the jamb;

each positioning screw is inserted through a strike plate positioning openings and into a baseplate adjustment openings; and the baseplate and the baseplate bolt opening, and the strike plate and the strike plate bolt opening are respectively sized and shaped so the baseplate bolt opening and the strike plate bolt opening are capable of being repeatedly:

aligned with each other at a first bolt opening position to be a first bolt opening through the baseplate and the strike plate capable of receiving the bolt; and aligned with each other at a second bolt opening position to be a second bolt opening through the baseplate and the strike plate capable of receiving the bolt;

wherein the first bolt opening and second bolt opening have different vertical positions within the baseplate, the same vertical positions within the strike plate, and the same horizontal relationship with the baseplate and the strike plate;

the installed strike plate bolt opening is capable, without loosening the jamb attachment screws, of being repeatedly:

fixed on the baseplate at the first bolt opening position to permit receipt of the bolt within the first bolt opening by tightening the positioning screws in the strike plate positioning openings and baseplate adjustment openings;

vertically moved from the first bolt opening position to the second bolt opening position by loosening or removing positioning screws to permit vertical movement of the strike plate relative to the baseplate;

fixed on the baseplate at the second bolt opening position to permit receipt of the bolt within the second bolt opening by tightening positioning screws in the strike plate positioning openings and baseplate adjustment openings; and vertically moved from the second bolt opening position to the first bolt opening position by loosening or removing positioning screws to permit vertical movement of the strike plate relative to the baseplate.

2. A strike plate assembly kit for a strike plate assembly capable of being connected to a jamb and receiving a bolt from an adjacent door comprising:

a baseplate sized and shaped to be capable of being connected to the jamb and receiving the bolt, the baseplate comprising:

a baseplate bolt opening in the baseplate capable of receiving the bolt;

an attachment opening in the baseplate capable of receiving an attachment screw; and a baseplate adjustment opening in the baseplate capable of receiving a positioning screw;

a strike plate sized and shaped to be capable of being positioned between the door and the baseplate, connected to the baseplate, and receiving the bolt, the strike plate comprising:

a strike plate bolt opening in the strike plate capable of receiving the bolt; and a strike plate positioning opening in the strike plate, being a slot through the strike plate, having a vertical length at least 50% longer than its horizontal width, and sized and shaped to be capable of receiving the positioning screw, wherein vertical is the approximate longitudinal direction of the jamb face adjacent to the door, and horizontal is the approximate direction along the jamb face orthogonal to the vertical;

an attachment screw sized and shaped to be capable of being inserted through the baseplate attachment opening and into the jamb and tightened into the jamb to hold the baseplate to the jamb;

the strike plate does not have openings for receiving the attachment screws;

the positioning screw is sized and shaped to be capable of being inserted through the strike plate positioning opening and into the baseplate adjustment opening;

the strike plate positioning opening and the baseplate adjustment opening are respectively positioned, sized, and shaped to be capable of being aligned with each other and receive the positioning screw through the strike plate positioning opening and into the baseplate adjustment opening;

the strike plate assembly kit components, namely, the baseplate, the strike plate, the attachment screw, and the positioning screw, are sized and shaped to be capable of being assembled into a strike plate assembly and installed on the jamb, wherein: the attachment screw is inserted through the baseplate attachment opening and into the jamb and tightened into the jamb to hold the baseplate to the jamb;

the positioning screw is inserted through the strike plate positioning opening and into the baseplate adjustment opening;

the baseplate outer face is comprised of a baseplate friction portion having an uneven surface, the friction portion capable of causing more friction with the strike plate inner face than a baseplate outer face without the friction portion;

the strike plate inner face is comprised of a strike face friction portion having an uneven surface, the strike face friction portion capable of causing more friction when moved against the baseplate outer face than a strike plate inner face without the friction portion;

the baseplate friction portion and the strike plate friction portion are each located so at least part of the baseplate friction portion and part of the strike plate friction portion press against each other when the positioning screw presses the strike plate against the baseplate, and the pressed together baseplate friction element and the strike plate friction element prevent the strike plate from moving vertically relative to the baseplate;

the baseplate and the baseplate bolt opening and the strike plate and the strike plate bolt opening are respectively sized and shaped so the baseplate bolt opening; and the strike plate bolt opening are capable of being repeatedly:

aligned with each other at a first bolt opening position to be a first bolt opening through the baseplate and the strike plate capable of receiving the bolt; and aligned with each other at a second bolt opening position to be a second bolt opening through the baseplate and the strike plate capable of receiving the bolt;

wherein the first bolt opening and second bolt opening have different vertical positions within the baseplate, the same vertical positions within the strike plate, and the same horizontal relationship with the baseplate and the strike plate;

the strike plate is capable, without moving loosening the jamb attachment screw, of being repeatedly:

fixed on the baseplate at the first bolt opening position to permit receipt of the bolt within the first bolt opening by tightening the positioning screw in the strike plate positioning openings and baseplate adjustment opening;

vertically moved from the first bolt opening position to the second bolt opening position by loosening or removing the positioning screw to permit vertical movement of the strike plate relative to the baseplate;

fixed on the baseplate at the second bolt opening position to permit receipt of the bolt within the second bolt opening by tightening the positioning screws in the strike plate positioning openings and baseplate adjustment openings; and vertically moved from the second bolt opening position to the first bolt opening position by loosening or removing the positioning screw to permit vertical movement of the strike plate relative to the baseplate; and wherein the first bolt opening and second bolt opening have different vertical relationships with the baseplate and the same horizontal relationship with the baseplate.

3. The strike plate assembly kit of claim 2 wherein the baseplate friction element is comprised of multiple parallel teeth and valleys, the strike plate friction element is comprised of multiple parallel teeth and valleys, and the baseplate teeth and valleys and the strike plate teeth and valleys are sized and shaped to mesh with each other when the positioning screws press the baseplate teeth and valleys, and the strike face teeth and valleys together and prevent the strike face from being vertically movable against the baseplate.

4. The strike plate assembly kit of claim 2 wherein a first baseplate friction portion is located above the baseplate opening and, a second baseplate friction portion is located below the baseplate opening, and a first strike plate friction portion is located above the strike plate opening and a second strike face friction portion is located below the strike plate opening.

5. The strike plate assembly kit of claim 2 wherein a first vertical column of baseplate teeth and valleys is located above the baseplate opening and a second vertical column of baseplate teeth and valleys is located below the baseplate opening, and a first vertical column of strike plate teeth and valleys is located above the strike plate opening and a second vertical column of the strike face teeth and valleys is located below the strike plate opening.

6. The strike plate assembly kit of claim 4 wherein the attachment openings on the outer face of the baseplate are beveled at a first attachment opening angle, and the attachment screws have screw heads with a screw head angle, the attachment openings and the screw heads being sized and shaped so the attachment screws are capable of being inserted through the attachment openings and into the jamb, the screw heads hold the baseplate to the jamb, and the screw heads not prevent the baseplate teeth and valleys from meshing with the strike plate teeth and valleys.

7. A strike plate assembly connected to a jamb for receiving a bolt from an adjacent door comprising:

a baseplate connected to the jamb, comprising:

a baseplate bolt opening in the baseplate for receiving the bolt;

an attachment opening in the baseplate for receiving an attachment screw; and a baseplate adjustment opening in the baseplate for receiving a positioning screw;

a strike plate between the door and the baseplate and connected to the baseplate, comprising:

a strike plate bolt opening in the strike plate for receiving the bolt; and a strike plate positioning opening in the strike plate, being a slot through the strike plate, having a vertical length at least 50% longer than its horizontal width, for receiving the positioning screw;

an attachment screw inserted through the baseplate attachment opening and into the jamb, holding the baseplate to the jamb;

the strike plate does not have openings for receiving the attachment screws;

the positioning screw inserted through the strike plate positioning opening and into the baseplate adjustment opening holding the strike plate to the baseplate;

the strike plate assembly, namely the baseplate, the strike plate, the attachment screw, and the positioning screw are sized, shaped, and assembled so:

the positioning screw holds the strike plate on the baseplate at a first bolt opening position, at which first bolt opening position the bolt can be received through the strike plate bolt opening and into the baseplate bolt opening;

loosening the positioning screw permits the strike plate to be vertically moved relative to the baseplate from the first bolt opening position to a second bolt opening position on the baseplate, at which second bolt opening position the bolt can be received through the strike plate bolt opening and the baseplate bolt opening;

tightening the positioning screw holds the strike plate at the second bolt opening position; and loosening the positioning screw permits the strike plate to be vertically moved from the second bolt opening position to another bolt opening position at which other bolt opening position the bolt can be received through the strike plate bolt opening and into the baseplate bolt opening;

wherein loosening or tightening the positioning screw permits the strike plate to be repeatedly vertically moved between different bolt opening positions and held at different bolt opening positions, which different bolt opening positions have different vertical relationships with the baseplate and the same horizontal relationship with the baseplate, all without loosening the attachment screw or moving the baseplate.

8. The strike plate assembly of claim 7, further comprising;

the baseplate has an outer face facing away from the jamb comprised of multiple teeth and valleys;

the strike plate has an inner face facing toward the jamb comprised of multiple teeth and valleys; and the baseplate teeth and valleys and the strike plate teeth and valleys are sized and shaped to mesh with each other and prevent the strike plate from being vertically movable against the baseplate when the positioning screw presses the baseplate teeth and valleys, and the strike face teeth and valleys together.

9. The strike plate assembly of claim 8, further comprising;

a first vertical column of baseplate teeth and valleys located above the baseplate opening and a second vertical column of baseplate teeth and valleys located below the baseplate opening;

a first vertical column of strike plate teeth and valleys located above the strike plate opening and a second vertical column of the strike face teeth and valleys located below the strike plate opening;

a first positioning screw through the first vertical column strike plate teeth and valleys and the first vertical column of baseplate teeth and valleys, the first positioning screw holding the first vertical column strike plate teeth and valleys to the first vertical column of baseplate teeth and valleys; and a second positioning screw through the second vertical column on strike plate teeth and valleys and the first vertical column of baseplate teeth and valleys, the second positioning screw holding the second vertical column on strike plate teeth and valleys to the first vertical column of baseplate teeth and valleys.

10. The strike plate assembly kit of claim 7 further comprises a friction element; the friction element is capable of being placed between the baseplate outer face and the strike plate inner face; capable of holding the baseplate and strike plate immovable against each other when the positioning screws tighten the baseplate and the strike plate together, and capable of releasing the baseplate and strike plate from each other when the positioning screws are removed from the baseplate and strike plate.

* * * * *